United States Patent
Dahlgren et al.

(10) Patent No.: US 12,204,706 B2
(45) Date of Patent: Jan. 21, 2025

(54) BACKSIDE USER INTERFACE FOR HANDHELD DEVICE

(71) Applicant: Telefonaktiebolaget LM Ericsson (publ), Stockholm (SE)

(72) Inventors: Fredrik Dahlgren, Lund (SE); Alexander Hunt, Tygelsjö (SE); Andreas Kristensson, Södra Sandby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 18/561,220

(22) PCT Filed: May 27, 2021

(86) PCT No.: PCT/EP2021/064293
§ 371 (c)(1),
(2) Date: Nov. 15, 2023

(87) PCT Pub. No.: WO2022/248054
PCT Pub. Date: Dec. 1, 2022

(65) Prior Publication Data
US 2024/0256058 A1    Aug. 1, 2024

(51) Int. Cl.
*G06F 3/0354* (2013.01)
*G06F 1/16* (2006.01)
*G06F 3/038* (2013.01)

(52) U.S. Cl.
CPC ........ *G06F 3/03547* (2013.01); *G06F 1/1626* (2013.01); *G06F 1/1692* (2013.01); *G06F 3/038* (2013.01)

(58) Field of Classification Search
CPC .. G06F 3/03547; G06F 1/1626; G06F 1/1692; G06F 3/038; G06F 3/0488;
(Continued)

(56) References Cited

U.S. PATENT DOCUMENTS

| | | |
|---|---|---|
| 6,088,023 A | 7/2000 | Louis et al. |
| 7,903,845 B2 | 3/2011 | Matsunaga et al. |

(Continued)

FOREIGN PATENT DOCUMENTS

| | | |
|---|---|---|
| CN | 104461232 A | 3/2015 |
| CN | 106527693 A | 3/2017 |

(Continued)

OTHER PUBLICATIONS

PCT International Search Report, mailed Feb. 24, 2022, in connection with International Application No. PCT/EP2021/064294, all pages.

(Continued)

*Primary Examiner* — Hong Zhou
(74) *Attorney, Agent, or Firm* — Leffler Intellectual Property Law, PLLC; Kenneth B. Leffler (57) ABSTRACT

A device having a first side; a second side; a display configured to display any of a plurality of images on the first side; and a touch-sensitive input device disposed on the second side, wherein the touch-sensitive input device comprises a mapped touch area and an adjustment touch area. The device operation comprises obtaining an initial mapping that relates touch points of the mapped touch area to corresponding display points of a mapped area of the display, wherein the mapped area of the display is smaller than a total area of the display and has an initial position with respect to the display. First touch input data is received from the adjustment touch area, and a current position of the mapped area of the display is produced by adjusting the initial position of the mapped area of the display based on the first touch input data. A current mapping is produced by adjusting the initial mapping based on the current position of the mapped area. Second touch input data is received from the mapped touch area. The second touch input data is (Continued)

translated into a derived display position according to the current mapping. An action that is associated with the derived display position is then performed.

24 Claims, 7 Drawing Sheets

(58) Field of Classification Search
CPC .. G06F 3/04883; G06F 3/04886; G06F 1/169; G06F 3/041
See application file for complete search history.

(56) References Cited

U.S. PATENT DOCUMENTS

| | | | |
|---|---|---|---|
| 8,443,199 B2 | 5/2013 | Kim et al. | |
| 8,796,431 B2 | 7/2014 | Prasad | |
| 9,448,587 B2 | 9/2016 | Park | |
| 10,162,520 B2 | 12/2018 | Adams | |
| 2007/0268261 A1* | 11/2007 | Lipson | G06F 1/1692 345/169 |
| 2009/0219260 A1* | 9/2009 | Bick | G06F 3/041 345/173 |
| 2011/0043455 A1 | 2/2011 | Roth et al. | |
| 2011/0205169 A1 | 8/2011 | Yasutake | |
| 2012/0218200 A1 | 8/2012 | Glazer et al. | |
| 2012/0327009 A1 | 12/2012 | Fleizach | |
| 2013/0169560 A1 | 7/2013 | Cederlund et al. | |
| 2013/0176250 A1 | 7/2013 | Lee et al. | |
| 2014/0111452 A1 | 4/2014 | Park et al. | |
| 2014/0181739 A1 | 6/2014 | Yoo | |
| 2014/0218309 A1* | 8/2014 | Park | G06F 3/03547 345/173 |
| 2014/0267142 A1 | 9/2014 | MacDougall et al. | |
| 2014/0289642 A1 | 9/2014 | Prasad | |
| 2014/0362119 A1 | 12/2014 | Freund et al. | |
| 2014/0380209 A1 | 12/2014 | Tsukamoto | |
| 2015/0084885 A1 | 3/2015 | Kawamoto | |
| 2015/0128081 A1 | 5/2015 | Hsieh | |
| 2015/0138083 A1 | 5/2015 | Takano | |
| 2015/0205507 A1 | 7/2015 | Chen | |
| 2015/0261295 A1 | 9/2015 | Lee | |
| 2015/0338914 A1 | 11/2015 | Andrysco | |
| 2016/0034140 A1* | 2/2016 | Navsariwala | G06F 3/0488 715/788 |
| 2016/0162150 A1 | 6/2016 | Patel et al. | |
| 2016/0252968 A1 | 9/2016 | Noble | |
| 2016/0274761 A1 | 9/2016 | Alonso Ruiz et al. | |
| 2017/0031542 A1 | 2/2017 | Ryu et al. | |
| 2017/0102810 A1* | 4/2017 | Satake | G06F 3/03547 |
| 2017/0277387 A1* | 9/2017 | Yoo | G06F 3/0484 |
| 2018/0052518 A1 | 2/2018 | Zhu et al. | |
| 2019/0073125 A1 | 3/2019 | Adams | |
| 2019/0114021 A1 | 4/2019 | Oliver et al. | |
| 2019/0369829 A1 | 12/2019 | Turner et al. | |
| 2020/0356258 A1* | 11/2020 | Liu | G06F 3/0482 |
| 2021/0311573 A1* | 10/2021 | He | G06F 3/04842 |
| 2022/0300106 A1* | 9/2022 | Cheng | G06F 3/03545 |

FOREIGN PATENT DOCUMENTS

| | | | |
|---|---|---|---|
| CN | 105824545 B | 8/2017 | |
| CN | 102830914 B | 6/2018 | |
| CN | 108733282 A | 11/2018 | |
| EP | 2863297 A1 | 4/2015 | |
| EP | 2921942 A1 | 9/2015 | |
| EP | 3540584 A1 | 9/2019 | |
| KR | 10-1250821 B1 | 4/2013 | |
| KR | 20160019762 A | 2/2016 | |
| WO | 2015112405 A1 | 7/2015 | |
| WO | 2015126196 A1 | 8/2015 | |
| WO | 2015064008 A1 | 3/2017 | |
| WO | 2018057944 A1 | 3/2018 | |
| WO | 2018222111 A1 | 12/2018 | |
| WO | 2022248055 A1 | 12/2022 | |
| WO | 2022248056 A1 | 12/2022 | |
| WO | 2023078548 A1 | 5/2023 | |

OTHER PUBLICATIONS

PCT Written Opinion, mailed Feb. 24, 2022, in connection with International Application No. PCT/EP2021/064294, all pages.
YouTube, "How to shrink your android screen for one hand action", Mar. 11, 2017, https://www.youtube.com/watch?v=XTZf9QNex4l&ab_channel-HowToAndDiy, 4 pages.
Unknown, "Using One Handed Mode on my Samsung Phone", Samsung Australia, Mar. 19, 2021, https://www.samsung.com/au/support/mobile-devices/using-one-handed-mode/, 9 pages.
Lai, J. et al., "ThumbStroke: A Virtual Keyboard in Support of Sight-Free and One-Handed Text Entry on Touchscreen Mobile Devices", ACM Trans. Manage. Inf. Syst., vol. 10, No. 3, Article 11, Sep. 2019.
PCT International Search Report, mailed Mar. 3, 2022, in connection with International Application No. PCT/EP2021/064296, all pages.
PCT Written Opinion, mailed Mar. 3, 2022, in connection with International Application No. PCT/EP2021/064296, all pages.
Wikipedia, "Google ATAP", https://en.wikipedia.org/wiki/Google_ATAP, Nov. 24, 2020, pp. 1-6.
PCT International Search Report, mailed Feb. 9, 2022, in connection with International Application No. PCT/EP2021/064293, all pages.
PCT Written Opinion, mailed Feb. 9, 2022, in connection with International Application No. PCT/EP2021/064293, all pages.
Alepis, E., et al., "Human Smartphone Interaction: Exploring smartphone senses", in Proc. of The 5th International Conference on Information, Intelligence, Systems and Applications, 2014, 5 pages.
Jeliazkov, D., "Mobile Usability Made Simple", https://uxplanet.org/mobile-usability-made-simple-945e106e23eb, Feb. 28, 2019, 9 pages.
Zhuo, S., et al., "Real-time Smartphone Activity Classification Using Intertial Sensors-Recognition of Scrolling, Typing, and Watching Videos While Sitting or Walking", Sensors 2020, 20, 655, www.mdpi.com/journal/sensors, 18 pages.
Wikipedia, "Swype", https://en.wikipedia.org/w/index.php?title=Swype&oldid=1020497901, last edited Apr. 29, 2021, 7 pages.
Drewes, H., et al., "The MAGIC Touch: Combining MAGIC-Pointing with a Touch-Sensitive Mouse", in Proc. of Human-Computer Interaction—Interact 2009, PT II, vol. 5727, 14 pages.
PCT International Search Report, mailed Jul. 20, 2022, in connection with International Application No. PCT/EP2021/080563, all pages.
PCT Written Opinion, mailed Jul. 20, 2022, in connection with International Application No. PCT/EP2021/080563, all pages.
Non-Final Office Action issued Sep. 16, 2024 in connection with U.S. Appl. No. 18/562,307, 31 pages.

* cited by examiner

BACKSIDE USER INTERFACE FOR HANDHELD DEVICE

BACKGROUND

The present invention relates to technology that enables a user to operate a handheld device having a display, and more particularly to technology that enables a user to use one hand to simultaneously hold and operate a handheld device having a display.

Today's smartphones have touchscreens that not only display information to a user, but also enable the user to supply input to the device, such as selections and data. The user interacts with touchscreens primarily by touching the display with one or more fingers. However in the general case, touch interaction can have many types of gestural inputs (micro-interactions) such as tap, double-tap, slide, tap-slide, tap-hold, swipe, flip, pinch, and the like.

Inputting information in this way is very simple and accurate when the user holds the phone with one hand while interacting with the touchscreen with the other. Quite often, however, the user is holding the smartphone with one hand while the other hand is busy doing other things, for example, carrying a bag or similar. Relatively long ago, when phones were small and had physical buttons only on parts of the front surface, it was relatively easy for most people to use just one hand to both operate the phone and hold it (i.e., one-handed operation). However, with today's large phones, this is very difficult with the touch-based User Interface (UI) and it is consequently quite common that people drop the phone while trying to do so.

Disclosures such as U.S. Pat. No. 9,448,587B2 and WO2015064008A1 are understood to describe alternative ways of interacting with the device in which a touch area on the back of the device is used to simplify usability (e.g., by means of one-handed operations). Using a touch input area on the backside of the phone simplifies the use of the index (or other) finger to touch the backside input area while still holding the device in a firm grip with the thumb and remaining fingers. However, the reachable area of that finger is far smaller than the area of the front touchscreen, making it less accurate (e.g., if the backside touch input area is mapped to cover the entire front touchscreen area) or limited in reachability. It has also been shown that reachability is important for accuracy. Accordingly, the technology described in the above-referenced U.S. Pat. No. 9,448,587B2 and WO2015064008A1 publications are less than ideal because in that technology, the touch area will allow input only to a certain application or else the touch area is mapped to the full screen (i.e. the resolution of the mapping reduces the touch input resolution significantly).

Aside from using a backside touch input area, there have been other attempts to address the problem of one-handed operation. For example, U.S. Pat. No. 8,443,199 B2 and U.S. Pat. No. 7,903,845 B2 describe the use of an existing fingerprint sensor for interacting with the phone (e.g., for scrolling).

Also, publications such as US2013169560A1, US2014111452A1, and US2015261295A1 disclose methods in which gaze tracking is used to first identify a starting point for a touch input, followed by touch input for fine-tuning the position or activation by a touch input. Using gaze tracking to identify a starting point for touch input is an effective means to quickly zoom in on a certain area of the screen, but there are several drawbacks. One is the difficulty of doing so while walking (e.g., the phone and/or user is not stable), when in challenging light conditions (e.g., outdoor with intense sunlight), or when wearing glasses or sunglasses. One-handed smartphone operation would be highly beneficial in each of these situations.

Still further, another alternative involves using voice control to operate the phone without using any finger, but this is often somewhat limited in functionality (e.g., it permits the user to select typical items in a graphical UI). But this solution is not very practical in noisy or public situations. Moreover, this approach is rarely used for UI operations that are more complicated than commanding the phone to make a phone call or create and send a short text message. Other input modalities, such as Inertial Measurement Unit (IMU) gestures, are mostly used for display orientation, activity classification, and the like, but not very frequently for direct input or control.

There is therefore a need for technology that addresses the above and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that operates a device having a first side; a second side; a display configured to display any of a plurality of images on the first side; and a touch-sensitive input device disposed on the second side, wherein the touch-sensitive input device comprises a mapped touch area and an adjustment touch area. The device operation comprises obtaining an initial mapping that relates touch points of the mapped touch area to corresponding display points of a mapped area of the display, wherein the mapped area of the display is smaller than a total area of the display and has an initial position with respect to the display. First touch input data is received from the adjustment touch area, and a current position of the mapped area of the display is produced by adjusting the initial position of the mapped area of the display based on the first touch input data. A current mapping is produced by adjusting the initial mapping based on the current position of the mapped area. Second touch input data is received from the mapped touch area. The second touch input data is translated into a derived display position according to the current mapping. An action that is associated with the derived display position is then performed.

In another aspect of some but not necessarily all embodiments consistent with the invention, the adjustment touch area is disposed adjacent to a perimeter portion of the mapped touch area.

In yet another aspect of some but not necessarily all embodiments consistent with the invention, the first side and the second side are on opposite sides of the device.

In still another aspect of some but not necessarily all embodiments consistent with the invention, the device (101) comprises a first device part; and a second device part connected to the first device part by a hinge, the display is disposed on a side of the first device part; and the touch-sensitive input device is disposed on a side of the second device part.

In another aspect of some but not necessarily all embodiments consistent with the invention, device operation comprises receiving third touch input data from the adjustment touch area, wherein the third touch input data is produced from a continued touch of the adjustment touch area; repeatedly adjusting, for so long as the third touch input data is produced over a time interval without interruption, the current position of the mapped area of the display based on the third touch input data; and repeatedly adjusting, for so long as the third touch input data is produced over the time interval without interruption, the current mapping based on the adjusted current position of the mapped area.

In yet another aspect of some but not necessarily all embodiments consistent with the invention, device operation comprises causing the display to produce an image that indicates at least a border of the mapped area of the display at its current position.

In still another aspect of some but not necessarily all embodiments consistent with the invention, producing the image that indicates at least the border of the mapped area of the display at its current position comprises producing a highlighted image of the mapped area of the display by applying an alpha blending channel with semi-transparent color.

In another aspect of some but not necessarily all embodiments consistent with the invention, one or both of a height and position of the mapped touch area are dynamically controllable.

In yet another aspect of some but not necessarily all embodiments consistent with the invention, the derived output display position data identifies a display point on the display, and device operation comprises causing the display to produce an image of a current position marker at the display point on the display.

In still another aspect of some but not necessarily all embodiments consistent with the invention, device operation comprises selectively operating the device in one of a first mode and a second mode by operating the device in the first mode as a default mode of operation, wherein the second touch input data from the mapped touch area is ignored; and transitioning the device from operation in the first mode to operation in the second mode in response to the first touch input data matching first predefined activation gesture data.

In another aspect of some but not necessarily all embodiments consistent with the invention, device operation comprises transitioning the device from operation in the second mode to operation in the first mode in response to the first touch input data matching second predefined activation gesture data.

In yet another aspect of some but not necessarily all embodiments consistent with the invention, selectively operating the device in one of a first mode and a second mode comprises operating the device in the first mode as a default mode of operation, wherein the second touch input data from the mapped touch area is ignored; and transitioning the device from operation in the first mode to operation in the second mode in response to an indication that a double-tap on the second side or on an edge of the device has been detected.

In still another aspect of some but not necessarily all embodiments consistent with the invention, transitioning the device from operation in the first mode to operation in the second mode comprises: assigning an initial display point value for the current position marker; and normalizing a first-received second touch input data to correspond to the assigned initial display point value.

In another aspect of some but not necessarily all embodiments consistent with the invention, device operation comprises determining the initial position of the mapped area of the display based on a density of interaction points of an application having control of the display.

In yet another aspect of some but not necessarily all embodiments consistent with the invention, the mapped touch area comprises an active portion and an inactive portion, and device operation comprises adjusting a size of the active portion of the mapped touch area based on a detected size of a user hand.

In still another aspect of some but not necessarily all embodiments consistent with the invention, device operation comprises detecting that first touch input data matches predefined keyboard activation gesture data, and in response performing: displaying a virtual keyboard on the display; and using further touch input data from the mapped touch area to control a virtual keyboard application.

In another aspect of some but not necessarily all embodiments consistent with the invention, producing the current position of the mapped area of the display by adjusting the initial position of the display based on the first touch input data comprises setting the current position of the mapped area to a first known position of an input area of an application that is being run by the device when the first touch input data matches a predetermined touch input data value. In some but not necessarily all of these embodiments, device operation comprises setting the current position of the mapped area to a second known position of an input area of the application that is being run by the device when subsequent touch input data matches the predetermined touch input data value.

In yet another aspect of some but not necessarily all embodiments consistent with the invention, device operation comprises receiving fourth touch input data from the adjustment touch area; and detecting that the fourth touch input data matches predefined swipe gesture data and in response to said detecting performing an action associated with the predefined swipe gesture data.

In still another aspect of some but not necessarily all embodiments consistent with the invention, device operation comprises receiving fifth touch input data from the adjustment touch area; and detecting that adjusting the current position of the mapped area of the display based on the fifth touch input data will cause the current position of the mapped area of the output display to cross an display boundary, and in response to the detecting, causing the device to replace a currently active screen display with a second screen display.

In another aspect of some but not necessarily all embodiments consistent with the invention, the device comprises communication circuitry configured to receive sixth touch input data from an adjustment touch input device of a device case, and configured to receive seventh touch input data from a mapped touch input device of the device case; and device operation comprises receiving the sixth touch input data from the adjustment touch input device of the device case; receiving the seventh touch input data from the mapped touch input device of the device case; using the sixth touch input data to control the current position of the mapped area of the display; and translating, according to the current mapping, the seventh touch input data into derived output display position data. In some but not necessarily all of these embodiments, receiving the sixth touch input data and receiving the seventh touch input data each comprise performing one of: receiving the sixth and seventh touch input data by means of radiofrequency reception; receiving the sixth and seventh touch input data by means of near-field communication; and receiving the sixth and seventh touch input data by means of a wired connection.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described in connection with a number of exemplary embodiments with reference to the figures, in which like parts are identified with the same reference characters.

To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of non-transitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In one aspect of embodiments consistent with the invention, the technology involves the ability to supply two types of touch input on the back of a handheld device (hereinafter simply referred to as "device") such as a smartphone: in one type, the touch indicates a particular area of the frontside touchscreen that is to be mapped to a backside input area of the device; and in a second type, the touch selects a particular point within the indicated, mapped frontside touchscreen area. In this manner, an improved ability to perform one-handed operation of, for example, a large smartphone without the user losing his/her grip is provided.

In an aspect of some but not necessarily all embodiments, a touch input area on the backside of the device has one portion (herein referred to as "adjustment touch area") that is used to move an area within the frontside touchscreen that is mapped to another portion of the backside touch input area (herein referred to as "mapped touch area"). The mapped touch area of the backside touch input area is mapped to the adjusted location.

In yet another aspect of some but not necessarily all inventive embodiments, the mapped area of the frontside touchscreen can present some form of highlighting on the display screen to indicate to the user the location of the mapped area.

With the above-described arrangement, the active part on the frontside touchscreen display is easily moved around by moving the finger into the adjustment touch area on the backside of the device.

In still another aspect of some but not necessarily all inventive embodiments, the farther to the edge the finger is moved, the faster the active mapped area is moved.

In yet another aspect of some but not necessarily all inventive embodiments, the area of the frontside touchscreen that is mapped to the backside mapped touch area can dynamically change to fit a certain application. In one example, the mapped touch area can be automatically mapped to a keyboard layout on the frontside touchscreen whenever the active application calls for a keyboard input action. In another example, the mapped touch area can be automatically mapped to a certain button or buttons displayed on the frontside touchscreen whenever an application expects input from any of these areas (e.g., for navigation or other usage).

In still another aspect of some but not necessarily all inventive embodiments, an IMU or other motion sensors provide sensor data that is interpreted as an indication of a particular area to be mapped or of an adjustment to the mapped area of the frontside touchscreen display, so that by tilting the device the area-of-interest is moved.

In yet another aspect of some but not necessarily all inventive embodiments, the user provides input to the device by directly touching the area of the display, hovering over it, or using an external input (e.g., smartwatch) to select such area. One could also use the physical buttons (e.g., volume buttons) to scroll through available areas or fields.

In still another aspect of some but not necessarily all inventive embodiments, the area of interest (i.e., the mapped frontside touchscreen area) is highlighted in some way, such as by lighting up and/or by having a pointer or cursor displayed to indicate the area. This could be activated by tapping on the rear touch pad or a special gesture on the rear touch pad.

In yet another aspect of some but not necessarily all inventive embodiments, when text input is required, a certain trigger brings a virtual keyboard up on the frontside touchscreen and keys are selected by the finger on the back on the device (e.g., as in known technology involving the user drawing a pattern covering the letters in the word and then having the system predict, from the pattern, which word is intended).

In still another aspect of some but not necessarily all inventive embodiments, the touch area on the back of the device can be much larger than what is easily reached by one finger holding the device, but by detecting where the hand/fingers are placed with respect to the device, the input is normalized to an area around that finger rather than using the complete touch-area. That detection can either be based on the first tap of the index finger, or by using radar, proximity, or other sensor that detects the finger above that backside touch area. That also simplifies the task of avoiding involuntary touch input by other parts of the hand/fingers holding the device. The finger position can be indicated on the frontside touchscreen as a marker. The marker can have different attributes depending on whether the finger is touching, just hovering in the air, or if an action is taking place.

In yet another aspect of some but not necessarily all inventive embodiments, the position of, and reachability of the index finger on the backside is predicted by the detection of which hand is holding the phone and where the other fingers are placed. Technology for detecting the grip is known in the art, (see, e.g., WO 2015/112405 A1), and a complete description of such technology is beyond the scope of the inventive embodiments described herein.

A nonlimiting exemplary embodiment consistent with the invention involves a device having a display and a touch-area on the back of the device. These elements have one or more of the following characteristics:

The display:
  In some embodiments, this can be a touchscreen that is responsive to predefined finger (or pen) movements having a meaning such as navigating in an application or menu. This type of user interface is typical in devices such as an Android Smartphone, iPhone, Apple Watch, tablet, or similar device.
  In other embodiments, the device has a display but not a touchscreen, and the user interface described below is the primary touch user interface for such devices. This class of embodiments is suitable for use in devices such as a camera (e.g. DSLR).
The touch-area on the back of the device is configured to detect finger movements and taps.
  In some embodiments, also sensor(s) detecting movements and gestures of finger(s) above the back-side touch area.

In some but not necessarily all exemplary embodiments, the device is further configured with an Inertial Measurement Unit (IMU) that is used to move an activation area.

In another aspect of some but not necessarily all embodiments consistent with the invention the device is further configured with a touch area configured to enable a user to move an activation area. This aspect and others are discussed in greater detail in the following.

Figures 1A, 1B, 1C:
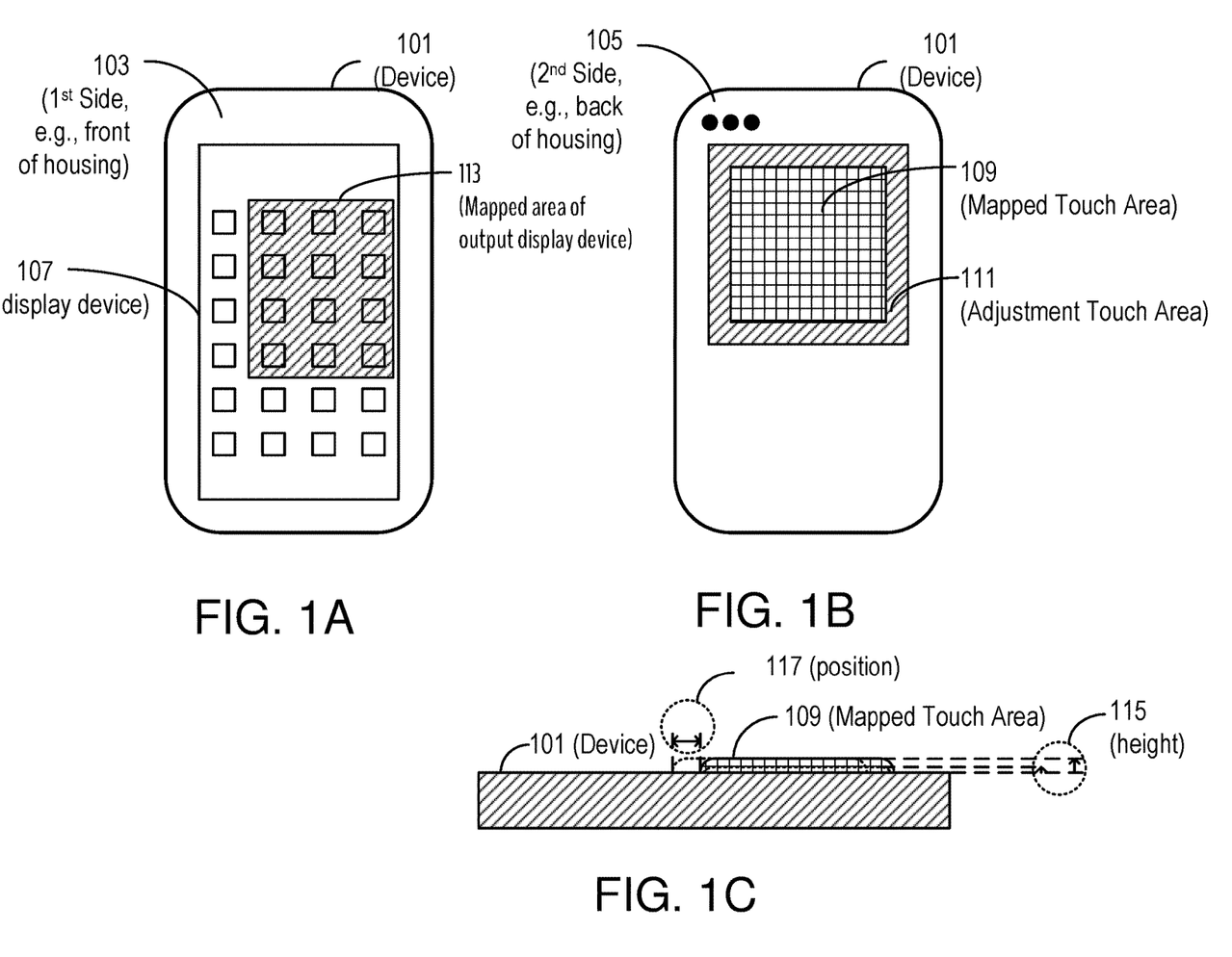
FIGS. 1A, 1B, and 1C depict aspects of a device 101 such as, but not limited to, a smart phone.

FIGS. 1A, 1B, and 1C depict aspects of a device 101 such as, but not limited to, a smart phone. The device 101 has a first side 103 (e.g., a front of a device housing) and a second side 105 (e.g., a back of the device housing). The first side 103 has an output display device 107. In devices such as a smart phone, the output display device 107 is often configured coincident with a related touch input device. However, the presence of a related touch input device is not an essential aspect of inventive embodiments, and the functionality of any such related touch input device is not discussed here with relation to FIG. 1A and one press B. The second side 105 has two touch input areas, one of which is denoted a mapped touch area 109, and the other of which is denoted an adjustment touch area 111. The size of the mapped touch area 109 and the adjustment touch area 111 in combination is advantageously configured to be smaller than the size of the output display device 107 and is preferentially dimensioned so as to be reachable at any point by a finger of the user as the user holds the device 101. Suitable dimensions can be determined in a number of different ways. For example, they can be determined by activating a setup/calibration mode that the user participates in. Alternatively, the system can track the user's fingers as the user uses the device, and from information derived from the tracking estimate suitable dimensions. In another alternative, suitable dimensions can be based on a selected user profile (e.g., based on age so that, for example, a younger person might have smaller hands.)

Touch points of the mapped touch area 109 are mapped to corresponding output display points located within a mapped area of the output display device 113. To facilitate use of the mapped touch area 109, in some embodiments the mapped area of the output display device 113 is made visually distinguishable from a remaining portion of the output display device 107 so that the user can readily ascertain what portion of the output display device 107 is mapped to the mapped touch area 109. Such a visual distinction can be, for example, a visually semi-transparent highlighting of the mapped area of the output display device 113.

In some but not necessarily all embodiments, tactile feedback is given to the user to help the user identify the location of the mapped touch area 109 on the back of the device. As illustrated in FIG. 1C, this can be by configuring one or both of the mapped touch area 109 and the adjustment touch area 111 as raised areas on the back of the device 101. In embodiments in which both the mapped touch area 109 and adjustment touch area 111 are raised, their heights can be equal to one another, or can alternatively be different in order to provide the user more tactile feedback to distinguish between the two. In some embodiments each raised area can be a permanent fixture of the device 101. But in alternative embodiments, and as shown in FIG. 1C, the presence and/or location of the mapped touch area 109 and/or adjustment touch area 111 can be dynamically controlled by forming the mapped touch area 109 from an electro-active polymer (EAP) or other material that can be deformed under the control of electronic means. As shown in the figure, the height 115 and/or position 117 of the mapped touch area 109 can therefore be made adjustable to best suit a user's hand size and other characteristics.

The adjustment touch area 111 is, in some but not necessarily all inventive embodiments, configured as a perimeter area around the mapped touch area 109. Both the mapped touch area 109 and the adjustment touch area 111 are reachable by a user's finger as the user holds the device 101. By moving the finger into the adjustment touch area 111, the mapped area of the output display device 113 will start to move in a direction in correspondence with a direction of movement of the finger. For example, if the finger moves to the left (from the point of view of a person looking at the second side 105) within the adjustment touch area 111, the mapped area of the output display device 113 correspondingly moves to the right (from the point of view of a person looking at the first side 103). In an aspect of some but not necessarily all embodiments, the further out into the adjustment touch area 111 the finger is moved, the faster the movement of the mapped area of the output display device 113 will be.

Figures 2A, 2B:
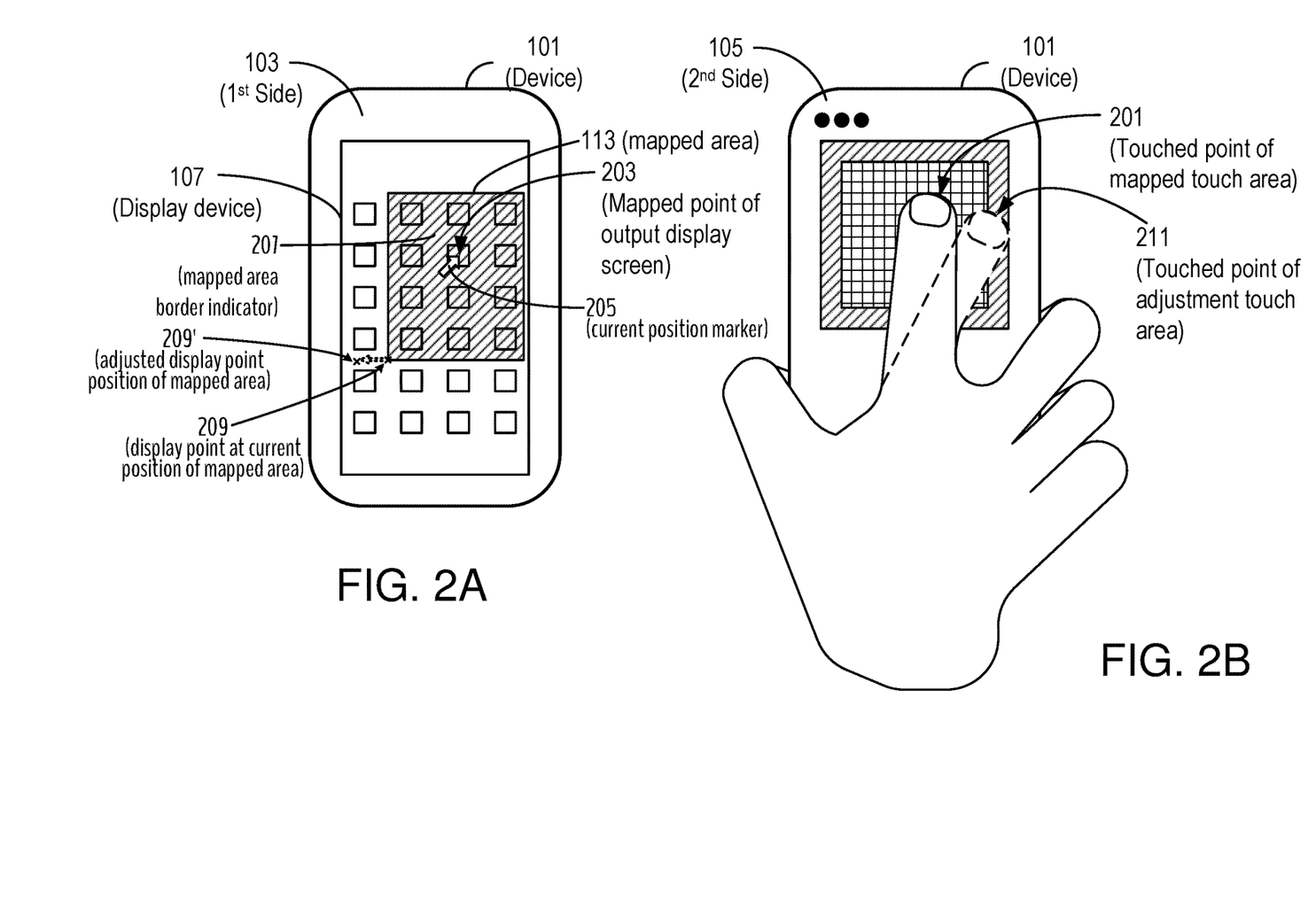
FIGS. 2A and 2B illustrate other aspects of the device of FIG. 1.

Further aspects of exemplary embodiments consistent with the invention are now discussed with reference to FIGS. 2A and 2B, which again illustrate aspects of the device 101. In this example, a user's hand can be seen gripping the second side 105 of the device 101. As mentioned earlier, touch points within the mapped touch area 109 are mapped to corresponding points within the mapped area of the output display device 113. Consequently, when the user touches a point 201 in the mapped touch area 201 as shown in FIG. 2B, the device responds as though the user had touched a mapped point 203 of the output display as shown in FIG. 2A. To assist the user in this respect, in accordance with some but not necessarily all embodiments, a current position marker 205 is presented by the display device 107 to indicate to the user the current position that the user is touching. And in accordance with some but not necessarily all embodiments, the display device 107 is caused to display some sort of mapped area border indicator 207 that informs the user about the range of points that are presently mapped to the mapped touch area 109. In this way, the user can grip the phone in a natural way with one hand and at the same time with that same hand interact with the mapped area of the output display device 113. The mapped area border indicator 207 can, for example, be embodied as a highlighted area within the display device 107 by means of an alpha blending channel with semi-transparent color. This color can be set to the users liking.

If the user wishes to interact with a presently unmapped portion of the output display device 107, the user can adjust the location of the mapped area of the output display device 113 to make it coincide with the desired presently unmapped portion. Location adjustment of the mapped area of the output display device 113 is made by the user extending the finger into a portion of the adjustment touch area 111 that will cause the mapped area of the output display device 113 to move in a desired direction towards the desired presently unmapped portion. For example, if a display point 209 at the lower left corner of the mapped area 113 is presently at a current position of the mapped area, the user may cause that display point (and the entire mapped area 113 with it) to move to the left (indicated by the dashed line arrow) by extending the finger to a touch point 211 on a right side of the adjustment touch area 111.

Figure 3:
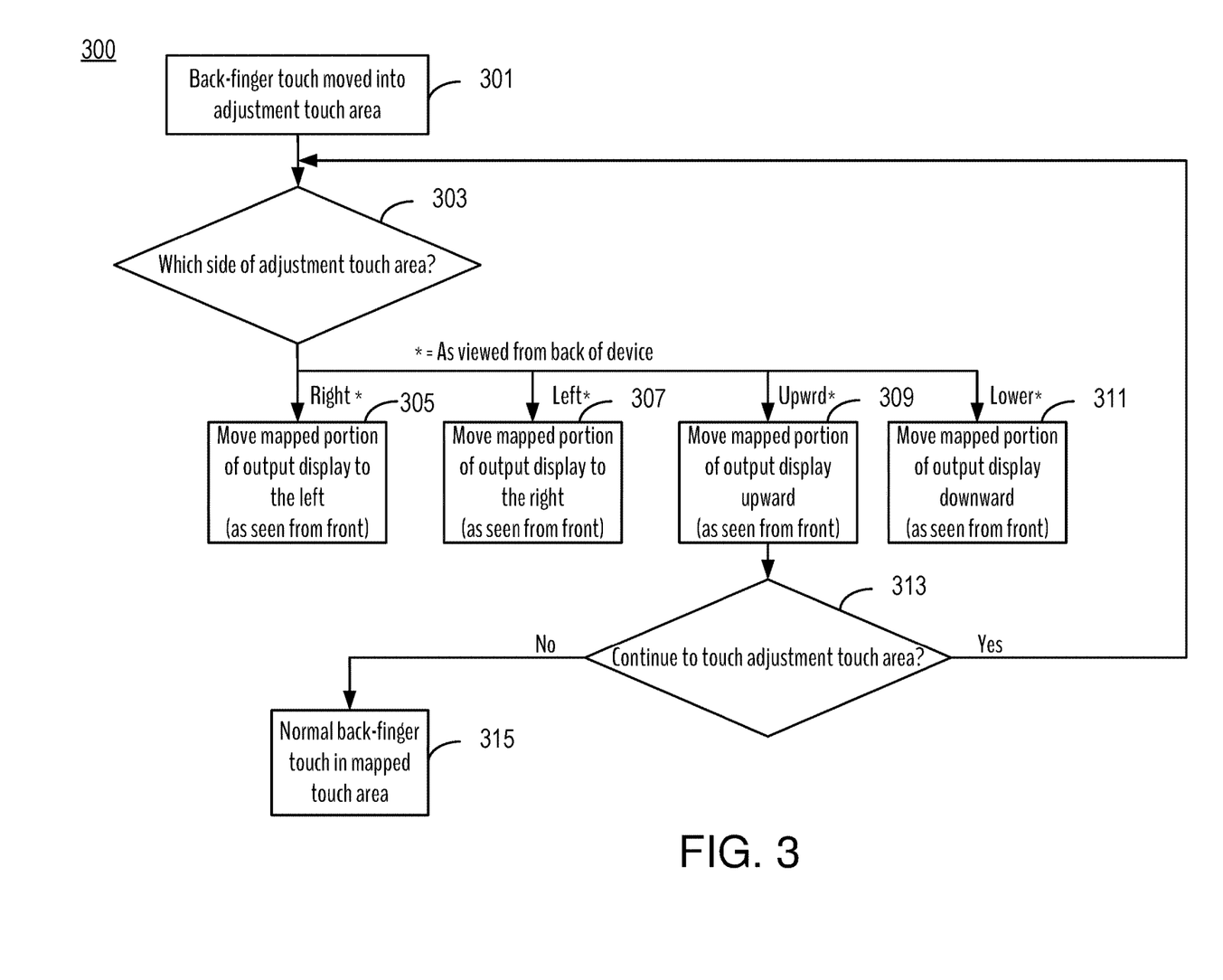
FIG. 3 is, in one respect, a flowchart of actions taken by the device to bring about adjustment of the mapped touch area over a corresponding mapped area of the output display device.

More particularly, FIG. 3 is, in one respect, a flowchart of actions taken by the device 101 to bring about adjustment of the mapped touch area 109 over a corresponding mapped area of the output display device 113. In other respects, the blocks depicted in FIG. 3 can also be considered to represent means 300 (e.g., hardwired or programmable circuitry or other processing means) for carrying out the described actions.

At step 301, it is detected that finger of the user has touched a point in the adjustment touch area 111. In response, it is determined where in the adjustment touch area 111 that touch was detected (decision block 303). The mapped area is then moved in correspondence with the location of the detected touch. In the non-limiting exemplary embodiment, if the location of the detected touch is to the right as viewed from the back, then the mapped area of the output display device 113 is moved to the left as seen from the front (step 305); if it is to the left as seen from the back, then the mapped area of the output display device 113 is moved to the right as seen from the front (step 307); if it is upward as seen from the back, then the mapped area of the output display device 113 is moved upward as seen from the front (step 309); and if it is to the downward as seen from the back, then the mapped area of the output display device 113 is moved downward as seen from the front (step 311). In alternative embodiments, mapping can be modified. For example, if the location of the detected touch has moved to the right as viewed from the back, then the mapped area of the output display can be moved to the right as seen from the front; and similarly, if the location of the detected touch has moved to the left as viewed from the back, then the mapped area of the output display can be moved to the left as seen from the front.

After adjusting the mapped area, a test is performed to determine whether the user is continuing to touch the adjustment touch area 111 (decision block 313). If so ("Yes" path out of decision block 313) then actions back at decision block 303 and the process continues as described above.

However, if it is detected that the user is no longer touching the adjustment touch area 111 ("No" path out of decision block 313) then adjustment of the mapped area is concluded and a finger touch to the mapped touch area 109 operates as described earlier, but now with respect to an adjusted placement of the mapped area of the output display device 113.

In other aspects of some but not necessarily all embodiments of the invention, adjustment of the mapped area of the output display device 113 further includes an operation in which the farther into the adjustment touch area 111 the user reaches, the faster the mapped area 113 moves within the area of the output display device 107.

It is advantageous to not have the mapped functionality (as described above) active all the time in order to avoid having the device's conventional user interface behave in an uncontrolled manner during normal two-handed operation, and also to avoid having the mapped area border indicator 207 being displayed all of the time. Therefore, in some but not necessarily all embodiments of the invention, a mechanism is provided that enables activation and deactivation of the mapping functionality. In some embodiments, activation is triggered by a predefined sense input, such as a double tap on the back of the device, or within the mapped touch area 109 and/or the adjustment touch area 111. Alternatively a predefined gesture (e.g., a swipe gesture, or a finger-drawn shape such as a circle) can be detected and used to activate the one-handed operation as described above. In yet another alternative, the device can be configured to be responsive to a predefined button operation, such as holding a button while interacting with 1 of the touch-areas, or clicking a button that activates or deactivates interaction with the mapped and adjustment touch-areas 109, 111.

As to deactivation, in some but not necessarily all embodiments consistent with the invention, the one-handed user interface mode is stopped by a certain gesture, such as but not limited to double-tapping or swiping a certain pattern on the mapped touch area 109 and/or adjustment touch area 111, or by means of a button press, or a voice command. A person having ordinary skill in the art will readily understand that different stop gestures or stop commands are possible, and that the gesture or command chosen for this purpose should not also be used to indicate a conflicting command, such as selecting an icon for starting an application.

Upon activation, an initial mapping can be applied using a predefined position and a predefined size. In some embodiments the users are able to set these predefined values themselves. Once activated, mapping can be adjusted using the adjustment touch area 111 as discussed above.

Once the backside touch is activated by any of the means described above, the device 101 needs to determine a suitable way of mapping it to the output display device 107 on the first side 103 of the device 101. This can be done in any of a number of ways. The following are nonlimiting examples:

1. Where the output display device 107 is associated with a touch input device (e.g., on the first side 103 of the device 101) points within the mapped touch area 109 are mapped to an active application and more specifically to where the application has the most interaction points. This information is known by the application since it sets what parts of the touch screen will provide an input to the application. For example, if the application is keypad interface for establishing a phone connection, then the mapped touch area 109 on the second side 105 of the device 101 is initially mapped to the keypad being displayed on the output display device 107.
2. Map points within the mapped touch area 109 to corresponding points centered within the output display device 107.
3. Map points within the mapped touch area 109 to a mapped area 113 having a suitably oriented corner placed at any of the corners of the output display device 107.
4. Map points within the mapped touch area 109 to the latest location used by the mapped touch. 109.

In an alternative class of embodiments, the operation of an application running on the device 101 is aligned with the one-handed operation using the mapped touch area 109 as described above, so that the interaction area would be re-arranged to fit the reachable area of the mapped touch area 109.

Figure 4:
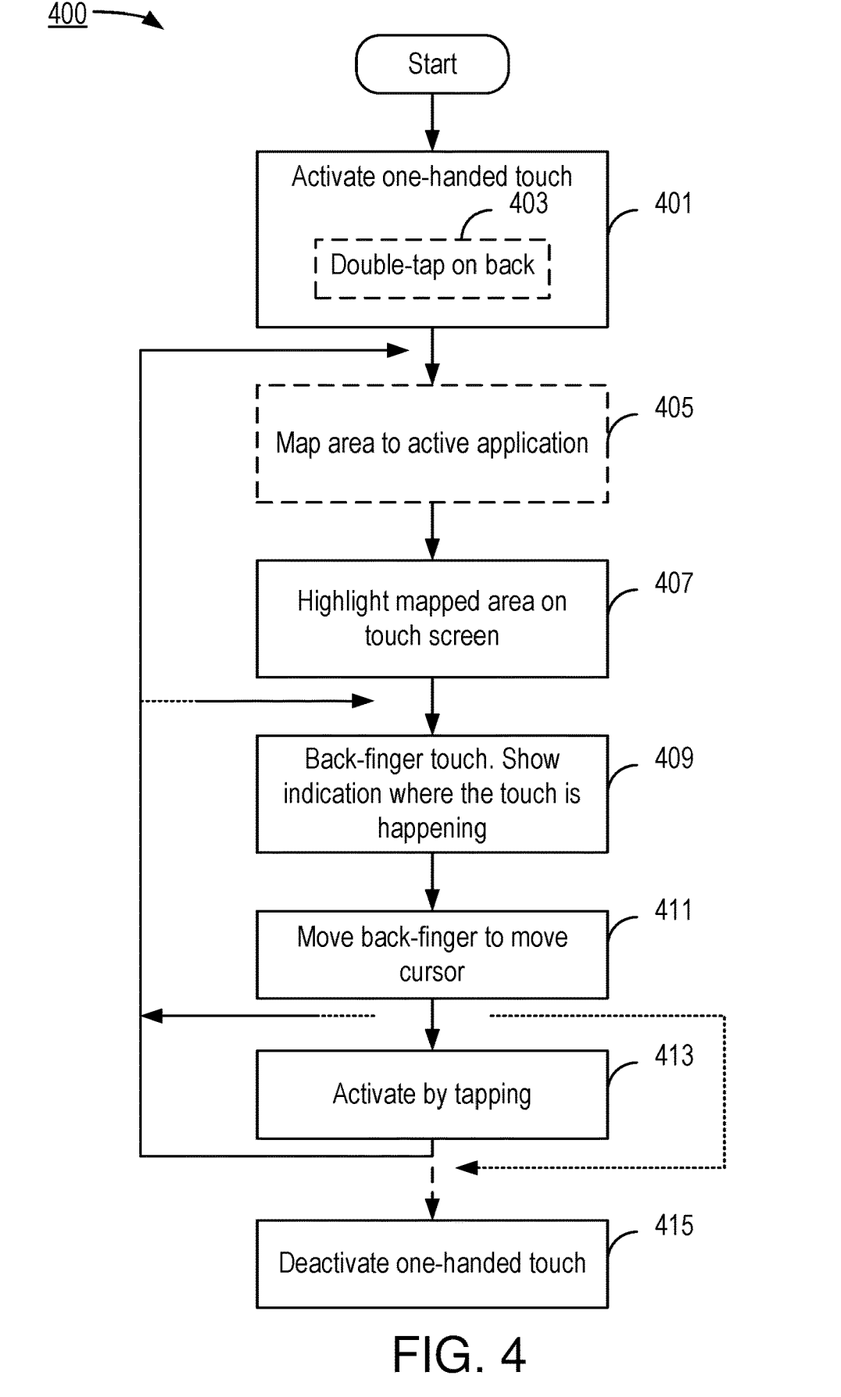
FIG. 4 is, in one respect, a flowchart of some actions taken by the device in a typical back-handed operation session with the user.

FIG. 4 is, in one respect, a flowchart of some actions taken by the device 101 in a typical back-handed operation session with the user. In other respects, the blocks depicted in FIG. 4 can also be considered to represent means 400 (e.g., hardwired or programmable circuitry or other processing means) for carrying out the described actions.

The mapping function associated with the mapped touch area 109 is, in this example, initially deactivated. Accordingly, an initial step involves the user taking some predefined action to activate the system (step 401). As described earlier, this can be in a nonlimiting example the user double-tapping on the back of the device 101. The system responds by transitioning into an active state.

In this example, an application is assumed to be already running in the device 101. Accordingly, an optional step involves setting an initial mapping of the mapped touch area 109 to points of an area within the output display device 107 (i.e., an initial positioning of the mapped area of the output display device 113 within the output display device 107) such that it will include a likely input area that the user will want to access (step 405). Alternatively, a predefined default positioning of the mapped area of the output display device 113 can be applied.

To facilitate the user's interactions with the device 101 in this mode of operation, the mapped area of the output display device 113 is in some way highlighted on the output display device 107 (step 407).

When the user touches a point within the mapped touch area 109, a current position marker 205 is caused to be displayed and a corresponding mapped point of the output display device 107 to indicate to the user where the touch is happening (step 409). In some but not necessarily all embodiments consistent with the invention, the current position marker 205 changes characteristics depending on whether the user's finger is hovering, touching or tapping.

The user can then move (e.g., slide) there finger over the mapped touch area 109 to cause a corresponding movement of the current position marker 205 on the output display device 113 (step 411).

If the user wishes to activate a function that the current position marker 205 is pointing to, the user can tap the mapped touch area 109, and the device 101 will respond as though the user had tapped the mapped point 203 on the output display device 107 (step 413).

At some point the user will want to deactivate the system, and accordingly performs a predefined action as described earlier to cause this to happen (step 415).

It will be appreciated that a typical operation will not follow exactly in sequence as shown in FIG. 4. For example, the user may move the current position marker 205 a number of times before (if ever) activating a function indicated on the output display device 113. Accordingly, the flow from one indicated step to another may deviate from the above-described flow, and this is indicated by the dashed line flow indicators in FIG. 4.

In another aspect of some but not necessarily all embodiments consistent with the invention, wherein the back-finger touches the mapped touch-area 109, the set of touch points that make up the mapped touch area 109 is normalized to that point of the finger. This means that the touched spot will correspond to the selected spot on the output display device 107, and relative movements of the finger will correspond to relative movements on the display. The position of the activated part of the mapped touch area 109 is defined by the position of the activation trigger.

In yet another aspect of some but not necessarily all embodiments consistent with the invention, the mapped touch area 109 is not activated in its entirety. Instead, the size of the activated part of the mapped touch area 109 is, in some but not necessarily all embodiments, defined by the user based on the size of the user's hand.

In other embodiments, it is recognized that not all hands are made the same size, and for this reason the reachable portions of the mapped touch area 109 are predicted by detecting the user's grip position (as well as which hand is holding the device). In yet another aspect of some but not necessarily all embodiments and initial prediction can be improved over time by learning or adapting based on the user's previous grips and reachability.

In some embodiments, even the initial prediction can be made more accurate by engaging the user in a short training phase in which they are asked to hold the device 101 in various one-handed positions and to move their index finger on the second side 105 (e.g., back) of the device 101 as much as is comfortable. This would not be more time-consuming than the training that typically takes place to identify fingerprints.

In another aspect of some but not necessarily all embodiments consistent with the invention, a specific touch gesture applied to the mapped touch area 109 and/or adjustment touch area 111 brings up a virtual keyboard on the output display device 107 that can be used from the mapped touch area 109.

Figure 5:
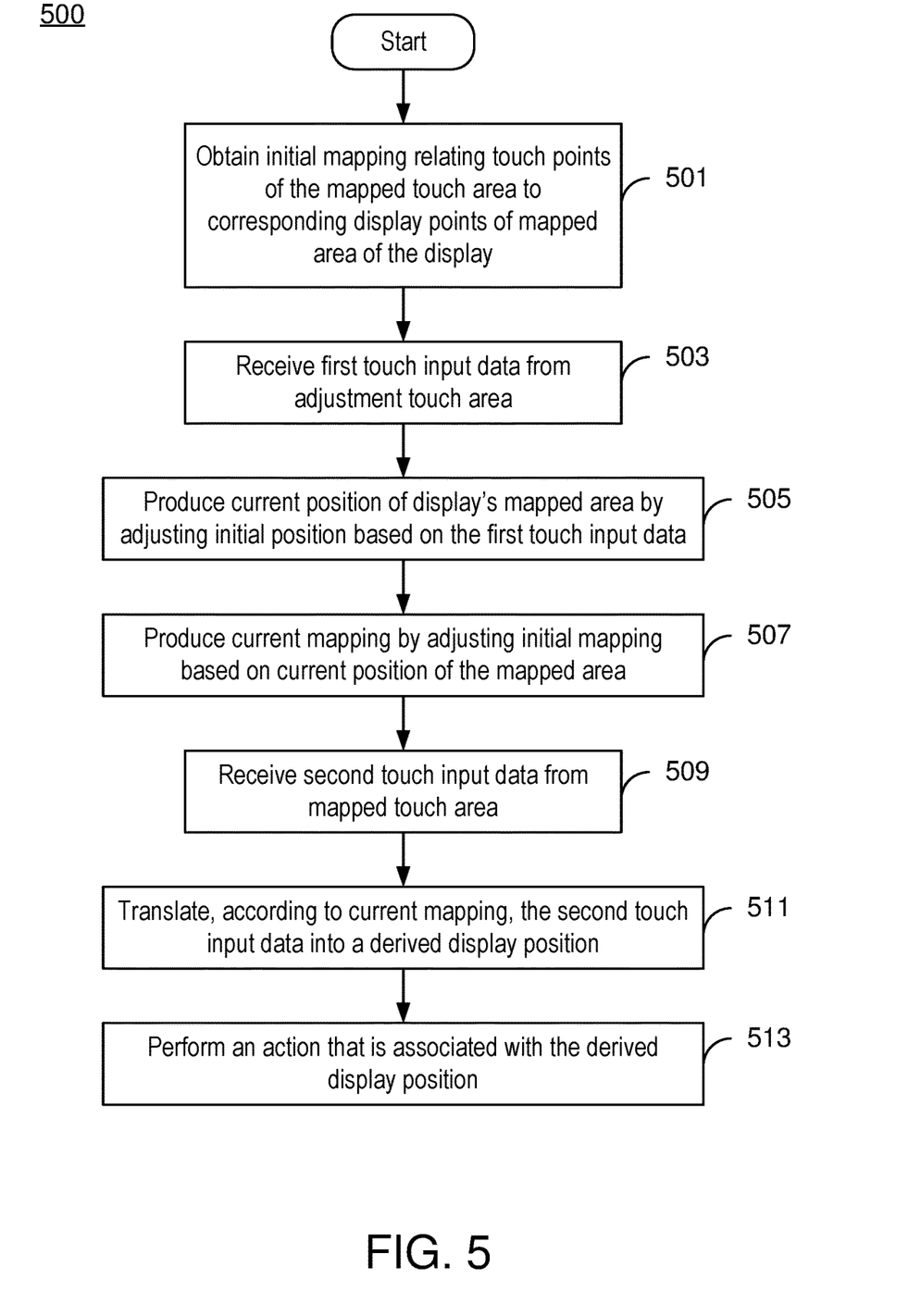
FIG. 5 is, in one respect, a flowchart of actions performed by a device that is configured with one-handed operation.

Further aspects of embodiments consistent with the invention are now described with reference to FIG. 5 which is, in one respect, a flowchart of actions performed by a device 101 that is configured with one-handed operation as described above. In other respects, the blocks depicted in FIG. 5 can also be considered to represent means 500 (e.g., hardwired or programmable circuitry or other processing means) for carrying out the described actions.

Consistent with the description set out so far, the actions are performed by a device 101 that comprises a first side 103; a second side 105; a display 107 configured to display any of a plurality of images on the first side 103; and a touch-sensitive input device disposed on the second side, wherein the touch-sensitive input device comprises a mapped touch area 109 and an adjustment touch area 111. It is noted that in alternative embodiments, the mapped touch area 109 and adjustment touch area 111 could be embodied as separate touch sensitive input devices.

The actions performed by the device 101 include obtaining (step 501) an initial mapping that relates touch points of the mapped touch area 109 to corresponding display points of a mapped area 113 of the display 107, wherein the mapped area 113 of the display 107 is smaller than a total area of the display 107 and has an initial position 209 with respect to the display.

First touch input data is received (step 503) when the user touches a point 211 within the adjustment touch area 111, and this is used as a basis for producing (step 505) a current (adjusted) position 209' of the mapped area of the display by adjusting the initial position 209 of the mapped area of the display based on the first touch input data.

A current mapping 201, 203 is produced (step 507) by adjusting the initial mapping based on the current position 209' of the mapped area 113.

When the user touches a point 201 within the mapped touch area 109, second touch input data is received (step 509) from the mapped touch area 109.

The second touch input data is translated (step 511), according to the current mapping, into a derived display position 203, and an action that is associated with the derived display position 203 is performed (step 513).

The various inventive aspects illustrated in the above-described exemplary embodiments can be applied in alternative embodiments as well. For example, activation of the system can be triggered in response to a double-tap on the side of the device 101 instead of on the back, and the deactivation of the one-handed operation can also be a double-tap on the side. In these embodiments, a double tap on the back of the device 101 can then be used for other purposes, such as but not limited to selecting items indicated by, for example, the current position marker 205.

In another class of alternative embodiments, motion sensors are provided and employed to detect when the device 101 is tilted. The tilting can be interpreted as an adjustment of the location of the mapped area 113 (which means also an adjustment of the mapping between the mapped touch area 109 and the mapped area 113 of the output display device 107.

In another class of alternative embodiments, physical buttons are used to select how touch points within the mapped touch area 109 will be mapped to display points within the mapped area 113 of the output display device 107. For example, a one button mode can be configured in which each button depression scrolls through the different possible selected areas in one direction. Alternatively, a two-button mode can be configured in which one button is used to control selection scrolling in one direction from among different possible selected areas, and another button used to control selection scrolling in the other direction.

Another class of alternative embodiments applies to the case in which certain applications have certain, set areas of the output display device 107 (e.g., when the output display device 107 is part of a touchscreen that also accepts input) where input from the user is expected (e.g., a virtual keyboard); these set areas are always the same whenever the application is launched. In such cases, moving the mapped area 113 of the output display device 107 by certain touches on the adjustment touch area 111 causes the mapped area 113 (and hence also the mapping function) to move to a next expected input area rather than linearly according to the finger movements within the adjustment touch area 111—in essence the active area snaps to expected input areas.

In another class of alternative embodiments, one or more predefined swipe movements/gestures are recognized when input via the mapped touch area 109 and/or adjustment touch area 111, and because all active applications to be brought up on the output display device 107 in order to allow the user to switch the focus from one application to another. This kind of application switching is otherwise very difficult to perform in one-handed operation on a conventional device.

In yet another class of alternative embodiments, a swipe-from-bottom-of-screen-up (which is a typical gesture applied to a front side touchscreen) is represented by a backside swipe that starts at the bottom edge of the adjustment touch area 111 and moves upward. Similarly, a conventional front side swipe-from-top-of-screen-down gesture is represented by a backside swipe that starts at the top edge of the adjustment touch area 111 and moves downward.

In still another class of alternative embodiments that apply when an application has multiple input text fields, the active input field (determined by a current mapping) is changed by a touch on the top, bottom, right, or left part of the adjustment touch area 111, and movements within the selected field are made by touching the mapped touch area 109.

In yet another alternative embodiment, if the finger is moved to the right side into the adjustment touch area 111 (as viewed from the back) and the mapped area 113 on the output display device 107 is already in its, for example, leftmost position (as viewed from the front), the gesture triggers an operation that switches a currently active page (i.e., presented on the output display device 107) to the next display page in order (if any). Similarly, a finger swipe to the left in the adjustment touch area 111 (as viewed from the back) when the mapped area 113 is already in its, for example, rightmost position on the output display device 107 (as viewed from the front) switches a currently active page to a next display page in order (if any) to the right (as viewed from the front). Top and bottom gestures could similarly map to relevant actions such as extending a top settings menu or bringing up a bottom all applications menu (as in Android devices) and/or credit card access page.

The technology involving a touch panel on the second side (e.g., backside) of a device 101 as described above can also be applied when the device 101 is to be enclosed by a protective case. An exemplary embodiment of this class of alternative embodiments will now be described with reference to FIG. 6. Here, a device 601 is schematically depicted with an accompanying protective case 603. It will be appreciated that in practice, the device 601 will somehow be enclosed by the protective case 603.

The device 601 comprises a display 619 that corresponds to the output display device 107 shown in FIG. 1. The protective case 603 comprises a touch system 615 that corresponds to a combination of the mapped touch area 109 and the adjustment touch area 111. In operation, these elements interact in the same way as was described above with respect to FIGS. 1 through 5. That description will therefore not be repeated here.

Figure 6:
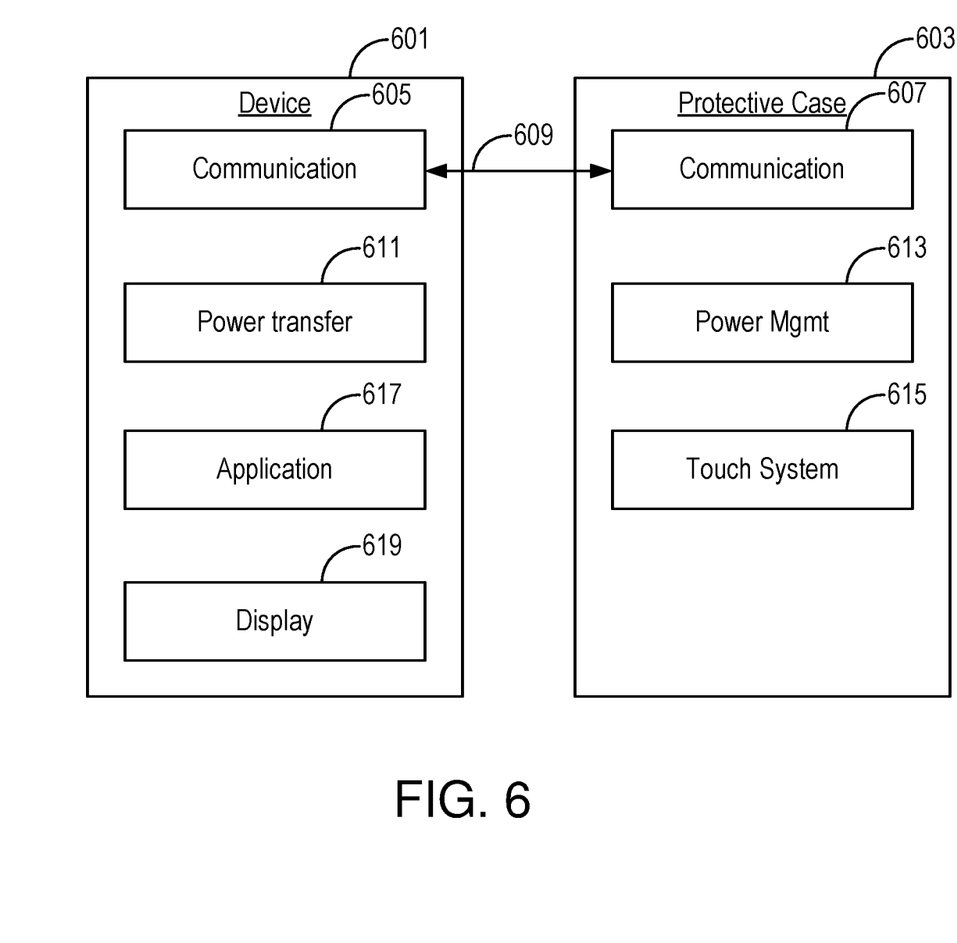
FIG. 6 is a block diagram of an embodiment in which a device operates cooperatively with a protective case.

The device 601 and protective case 603 together form a system. To enable them to work together, each includes a corresponding communication part 605, 607 that are communicatively linked (schematically illustrated by the double arrowed line 609). Communication between the device 601 and the protective case 603 can be embodied in a number of different ways. One embodiment employs radiofrequency (RF) communications technology, for example using any of the Bluetooth (BT) standards or other type of radio solutions or near-field communication (NFC) technology.

In an alternative embodiment, the protective case 603 has a connector that attaches to the device 601. Such a connector can be, for example, a USB connector or other proprietary communication connection. It can alternatively be a physical direct connection between the device 601 and the protective case 603 that uses conductive pads, pogo pins, springs or similar elements. Any suitable interface can be used for this communication connection, including standardized interfaces such as I2C, Serial Peripheral Interface (SPI), and the like.

As mentioned above, the protective case 603 includes a touch system 615. The touch system 615 contains a touch sensor at a position on the casing 603 that is suitable for being reached by a finger of the user when the user is holding the device in their hand, facing the display 619. The touch sensor is controlled by a touch integrated circuit (IC) that receives the signal from the touch sensor and forwards it to the device 601.

The communication from the protective case 603 to the device 601 is used to forward the touch sensor information from the protective case 603 to the device 601, and can be handled directly from the IC associated with the touch pad on the protective case 603 (e.g., using SPI, I2C or other supported interfaces in the touch IC) or alternatively by a separate IC that transfers the data from the touch IC using any suitable interface as is known by those of ordinary skill in the art.

The device 601 also includes an application 617 that handles input tactile data provided by the touch system 615 in the way described earlier with respect to the mapped touch area 109 and adjustment touch area 111. The application 617 receives the touch input from the touch system 615 in the protective case 603 and forwards this input data to the device system to work in the same way as in the embodiments described above (i.e., those that do not involve a protective case 603).

The protective case 603 requires a source of power in order to enable it to function. In the exemplary embodiment of FIG. 6, power is transferred from the device 601 to the protective case 603. The power transfer is, in some embodiments, via the communication interface 609 (e.g., when a USB cable or similar technology is utilized). Alternatively, NFC can be used for both power transfer and communication. In yet another alternative, if the protective case 603 has stand-alone power management, there is no need for power transfer from the smartphone.

In those embodiments in which the device 601 supplies power to the protective case 603, the device 601 includes a power transfer circuit 611 to manage the device's transfer of power, and the protective case 603 includes a power management circuit 613 to manage its storage and utilization of power. It will be noted that even when the device 601 is the source of power to the protective case 603, it is advantageous for the protective case 603 to nonetheless include some type of power storage mechanism (e.g., capacitor were small battery) in order to be able to flatten out any current spikes in the system.

In another class of alternative embodiments, the protective case 603 does not received power from the device 601 at all, but instead includes a battery that is preferably chargeable. In such embodiments, the protective case 603 should also include a mechanism for charging the included battery. Charging can be performed wirelessly using similar technology is that which is commonly used to charge smart phones and the like. Advantageously, wireless charging is applied to the device 601 and the protective case 603 simultaneously.

Figure 7:
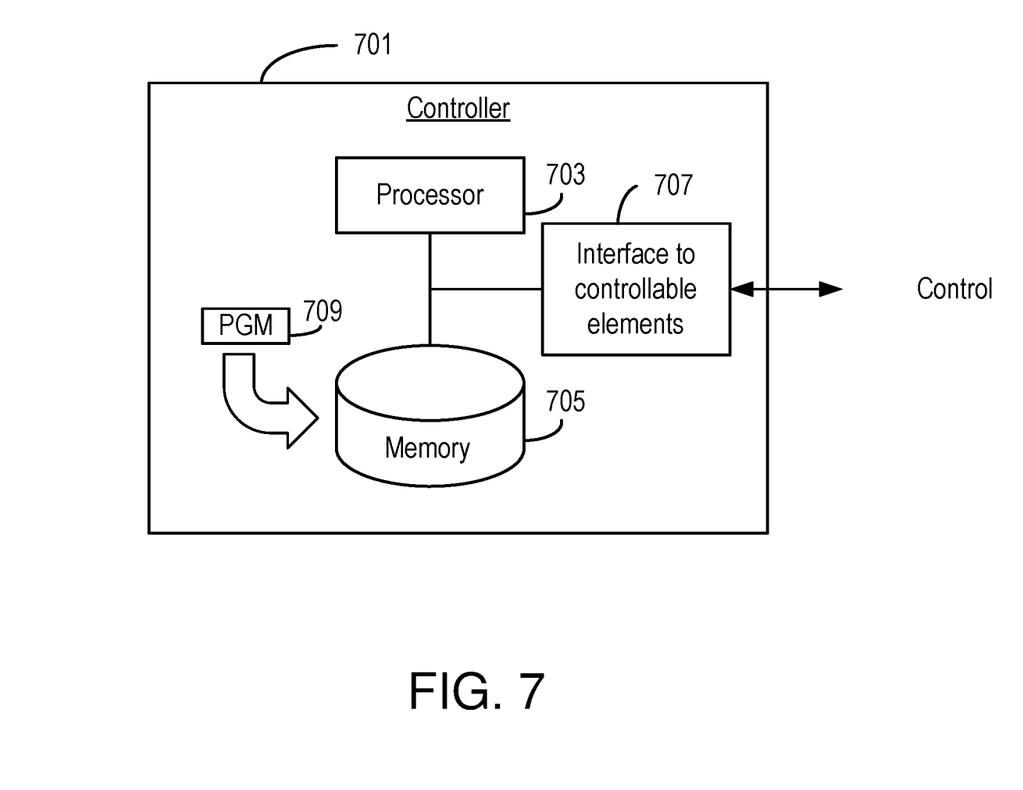
FIG. 7 is a block diagram of an exemplary controller of a device in accordance with some but not necessarily all exemplary embodiments consistent with the invention.

Aspects of an exemplary controller 701 that may be included in the device 101, 601 to cause any and/or all of the above-described actions to be performed as discussed in the various embodiments are shown in FIG. 7, which illustrates an exemplary controller 701 of a device 101, 601 in accordance with some but not necessarily all exemplary embodiments consistent with the invention. In particular, the controller 701 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 7, however, is programmable circuitry, comprising a processor 703 coupled to one or more memory devices 705 (e.g., Random Access Memory, Magnetic Disc Drives, Optical Disk Drives, Read Only Memory, etc.) and to an interface 707 that enables bidirectional communication with other elements of the device 101, 601. The memory device(s) 705 store program means 709 (e.g., a set of processor instructions) configured to cause the processor 703 to control other system elements so as to carry out any of the aspects described above. The memory device(s) 705 may also store data (not shown) representing various constant and variable parameters as may be needed by the processor 703 and/or as may be generated when carrying out its functions such as those specified by the program means 709.

It will be understood that various embodiments consistent with the invention include a combination of a mechanism to indicate an area on a display of the device and another mechanism that enables touch-control on another side of the device (e.g., on the back of the device) with these mechanisms being reachable by a finger of a user as that same hand is holding the device in order to enable a one-handed operation of, for example, a large smartphone with one hand without losing grip of the phone.

Some noteworthy aspects of the disclosed technology include:
  The addition of an adjustment area on a touch panel positioned on, for example, the backside of a device.
  The use of the adjustment area to orient a mapping between touch points of the backside touch panel and a sub-portion of a main display (e.g., on the front of the device). In some embodiments, this mapping can be considered to be between touch points of the backside touch panel and a sub-portion of an input touchpad on another side of the device (e.g., coincident with the output display of the device).
  An adjustable speed of movement of the mapped touch panel's active area within the main output display, with the speed being dependent on position of the touch in the perimeter area.
  Incorporating a backside touch input area with a protective casing of the device, and controlling the backside touch input area of the protective case in the manner described herein.

It will be appreciated that the herein-described technology provides a number of advantages over conventional technology. For example, it enables one-handed operation of a large smartphone while being held by the same hand of the user. In practice, such operation is typically not possible with conventional technology unless the user has very large hands, and even then an awkward operation and substantial risk of dropping the device are inherent.

The disclosed technology enables a device to have a touch area on the backside of the device having a good resolution with respect to a sub-portion of the full screen on the front of the device with touch input mapping being on a 1:1 basis and with the ability to move the mapped area around on the main screen in an easily understood way. The mapping can be zoomed in or zoomed out as well.

The invention has been described with reference to particular embodiments. However, it will be readily apparent to those skilled in the art that it is possible to embody the invention in specific forms other than those of the embodiment described above.

For example, the technology can also be relevant and therefore applied to other types of devices having a display, that the user wants to use with the same hand that holds the device. Such devices include, without limitation, tablet devices and cameras.

It is also noted that the exemplary embodiments involved front and back sides of devices. However, the illustrated first and second sides 103, 105, are not limited to being the front and back sides of the device. They can instead be any 2 different sides of the device. Further, the device itself can be in more than one part, such as a hinged device (e.g., flip phone). In such cases, it is possible (although not required) that the device comprises a first device part and a second device part connected to the first device part by a hinge. In such cases, the display can be disposed on a side of the first device part; and the touch-sensitive input device is disposed on a side of the second device part.

Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of operating a device that comprises a first side; a second side; a display configured to display any of a plurality of images on the first side; and a touch-sensitive input device disposed on the second side, wherein the touch-sensitive input device comprises a mapped touch area and an adjustment touch area,
the method comprising:
obtaining an initial mapping that relates touch points of the mapped touch area to corresponding display points of a mapped area of the display, wherein the mapped area of the display is smaller than a total area of the display and has an initial position with respect to the display;
receiving first touch input data from the adjustment touch area;
producing a current position of the mapped area of the display by adjusting the initial position of the mapped area of the display based on the first touch input data;
producing a current mapping by adjusting the initial mapping based on the current position of the mapped area;
receiving second touch input data from the mapped touch area;
translating, according to the current mapping, the second touch input data into a derived display position; and
performing an action that is associated with the derived display position.

2. The method of claim 1, wherein the adjustment touch area is disposed adjacent to a perimeter portion of the mapped touch area.

3. The method of claim 1, wherein the first side and the second side are on opposite sides of the device.

4. The method of claim 1, wherein the device comprises:
a first device part; and
a second device part connected to the first device part by a hinge,
wherein:
the display is disposed on a side of the first device part; and
the touch-sensitive input device is disposed on a side of the second device part.

5. The method of claim 1, comprising:
receiving third touch input data from the adjustment touch area, wherein the third touch input data is produced from a continued touch of the adjustment touch area;
repeatedly adjusting, for so long as the third touch input data is produced over a time interval without interruption, the current position of the mapped area of the display based on the third touch input data; and
repeatedly adjusting, for so long as the third touch input data is produced over the time interval without interruption, the current mapping based on the adjusted current position of the mapped area.

6. The method of claim 1, comprising:
causing the display to produce an image that indicates at least a border of the mapped area of the display at its current position.

7. The method of claim 6, wherein producing the image that indicates at least the border of the mapped area of the display at its current position comprises:
producing a highlighted image of the mapped area of the display by applying an alpha blending channel with semi-transparent color.

8. The method of claim 1, wherein one or both of a height and position of the mapped touch area are dynamically controllable.

9. The method of claim 1, wherein:
the derived output display position data identifies a display point on the display, and
the method comprises:
causing the display to produce an image of a current position marker at the display point on the display.

10. The method of claim 1, comprising:
selectively operating the device in one of a first mode and a second mode by:
operating the device in the first mode as a default mode of operation, wherein the second touch input data from the mapped touch area is ignored; and
transitioning the device from operation in the first mode to operation in the second mode in response to the first touch input data matching first predefined activation gesture data.

11. An apparatus for operating a device that comprises a first side; a second side; a display configured to display any of a plurality of images on the first side; and a touch-sensitive input device disposed on the second side, wherein the touch-sensitive input device comprises a mapped touch area and an adjustment touch area,
the apparatus comprising:
circuitry configured to obtain an initial mapping that relates touch points of the mapped touch area to corresponding display points of a mapped area of the display, wherein the mapped area of the display is smaller than a total area of the display and has an initial position with respect to the display;
circuitry configured to receive first touch input data from the adjustment touch area;

circuitry configured to produce a current position of the mapped area of the display by adjusting the initial position of the mapped area of the display based on the first touch input data;

circuitry configured to produce a current mapping by adjusting the initial mapping based on the current position of the mapped area;

circuitry configured to receive second touch input data from the mapped touch area;

circuitry configured to translate, according to the current mapping, the second touch input data into a derived display position; and circuitry configured to perform an action that is associated with the derived display position.

12. The apparatus of claim 11, wherein the adjustment touch area is disposed adjacent to a perimeter portion of the mapped touch area.

13. The apparatus of claim 11, wherein the first side and the second side are on opposite sides of the device.

14. The apparatus of claim 11, wherein the device comprises:
a first device part; and
a second device part connected to the first device part by a hinge,
wherein:
the display is disposed on a side of the first device part; and
the touch-sensitive input device is disposed on a side of the second device part.

15. The apparatus of claim 11, comprising:
circuitry configured to receive third touch input data from the adjustment touch area, wherein the third touch input data is produced from a continued touch of the adjustment touch area;
circuitry configured to repeatedly adjust for so long as the third touch input data is produced over a time interval without interruption, the current position of the mapped area of the display based on the third touch input data; and
circuitry configured to repeatedly adjust, for so long as the third touch input data is produced over the time interval without interruption, the current mapping based on the adjusted current position of the mapped area.

16. The apparatus of claim 11, comprising:
circuitry configured to cause the display to produce an image that indicates at least a border of the mapped area of the display at its current position.

17. The apparatus of claim 16, wherein the circuitry configured to produce the image that indicates at least the border of the mapped area of the display at its current position comprises:

circuitry configured to produce a highlighted image of the mapped area of the display by applying an alpha blending channel with semi-transparent color.

18. The apparatus of claim 11, wherein one or both of a height and position of the mapped touch area are dynamically controllable.

19. The apparatus of claim 11, wherein:
the derived output display position data identifies a display point on the display, and
the apparatus comprises:
circuitry configured to cause the display to produce an image of a current position marker at the display point on the display.

20. The apparatus of claim 11, comprising:
circuitry configured to selectively operate the device in one of a first mode and a second mode by:
operating the device in the first mode as a default mode of operation, wherein the second touch input data from the mapped touch area is ignored; and
transitioning the device from operation in the first mode to operation in the second mode in response to the first touch input data matching first predefined activation gesture data.

21. The apparatus of claim 20, comprising:
circuitry configured to transition the device from operation in the second mode to operation in the first mode in response to the first touch input data matching second predefined activation gesture data.

22. The apparatus of claim 20, wherein the circuitry configured to transition the device from operation in the first mode to operation in the second mode comprises:
circuitry configured to assign an initial display point value for a current position marker; and
circuitry configured to normalize a first-received second touch input data to correspond to the assigned initial display point value.

23. The apparatus of claim 11, comprising:
circuitry configured to selectively operate the device in one of a first mode and a second mode by:
operating the device in the first mode as a default mode of operation, wherein the second touch input data from the mapped touch area is ignored; and
transitioning the device from operation in the first mode to operation in the second mode in response to an indication that a double-tap on the second side or on an edge of the device has been detected.

24. The apparatus of claim 11, comprising:
circuitry configured to determine the initial position of the mapped area of the display based on a density of interaction points of an application having control of the display.

* * * * *

UNITED STATES PATENT AND TRADEMARK OFFICE
CERTIFICATE OF CORRECTION

PATENT NO. : 12,204,706 B2  
APPLICATION NO. : 18/561220  
DATED : January 21, 2025  
INVENTOR(S) : Dahlgren et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 32, delete "Intertial" and insert -- Inertial --, therefor.

In the Specification

In Column 2, Line 35, delete "nontransitory" and insert -- non-transitory --, therefor.

In Column 4, Line 14, delete "user hand." and insert -- user's hand. --, therefor.

In Column 6, Line 64, delete "on the" and insert -- of the --, therefor.

In Column 8, Line 13, delete "hands.)" and insert -- hands). --, therefor.

In Column 9, Line 24, delete "users liking." and insert -- user's liking. --, therefor.

In Column 11, Line 22, delete "mapped touch." and insert -- mapped touch area. --, therefor.

In Column 11, Line 64, delete "there" and insert -- their --, therefor.

In Column 12, Line 38, delete "and" and insert -- an --, therefor.

In Column 13, Line 42, delete "(which" and insert -- which --, therefor.

In Column 13, Line 55, delete "used to" and insert -- is used to --, therefor.

In Column 15, Line 62, delete "received" and insert -- receive --, therefor.

In Column 15, Line 67, delete "is that which is" and insert -- which is --, therefor.

Signed and Sealed this  
Twenty-first Day of October, 2025

John A. Squires  
*Director of the United States Patent and Trademark Office*